United States Patent
Elend et al.

(10) Patent No.: US 10,439,840 B1
(45) Date of Patent: Oct. 8, 2019

(54) METHOD AND DEVICE FOR COMMUNICATING DATA FRAMES ON A MULTI-MASTER BUS

(71) Applicant: NXP B.V., Eindhoven (NL)

(72) Inventors: Bernd Uwe Gerhard Elend, Hamburg (DE); Matthias Berthold Muth, Stelle (DE); Steffen Mueller, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/048,159

(22) Filed: Jul. 27, 2018

(51) Int. Cl.
| | |
|---|---|
| *H04L 12/413* | (2006.01) |
| *G06F 13/376* | (2006.01) |
| *H04L 5/00* | (2006.01) |
| *G06F 13/374* | (2006.01) |
| *H04L 12/40* | (2006.01) |

(52) U.S. Cl.
CPC ........ *H04L 12/4135* (2013.01); *G06F 13/374* (2013.01); *G06F 13/376* (2013.01); *H04L 5/0044* (2013.01); *H04L 2012/40215* (2013.01)

(58) Field of Classification Search
CPC ....... H04L 12/4135; H04L 2012/40215; G06F 13/374; G06F 13/376
See application file for complete search history.

(56) References Cited

U.S. PATENT DOCUMENTS

| | | | |
|---|---|---|---|
| 9,209,942 B2 | 12/2015 | Takada et al. | |
| 2010/0188972 A1* | 7/2010 | Knapp | H04L 12/43 |
| | | | 370/226 |
| 2014/0223258 A1* | 8/2014 | Hartwich | G06F 13/4282 |
| | | | 714/758 |
| 2016/0254924 A1* | 9/2016 | Hartwich | H04L 69/10 |
| | | | 370/468 |
| 2018/0049210 A9 | 2/2018 | Kellermann et al. | |
| 2018/0091329 A1 | 3/2018 | Matsushita et al. | |
| 2019/0020499 A1* | 1/2019 | Meier | H04L 12/40084 |

OTHER PUBLICATIONS

Proenza, J. et al.; "MajorCAN: A Modification to the Controller Area Network Protocol to Achieve Atomic Broadcast"; 2000; 8 pgs.
Kurachi, Ryo et al.; "Development of Scalable CAN Protocol"; SEI Technical Review, No. 71, Oct. 2010; pp. 31-36.

* cited by examiner

Primary Examiner — Glenn A. Auve

(57) ABSTRACT

Embodiments of a device and method are disclosed. In an embodiment, a method for communicating data frames on a bus that operates according to a multi-master bus protocol is disclosed. The method involves beginning transmission of a data frame from a node on the bus when the node gains control of the bus, wherein the multi-master bus protocol specifies a frame format that includes a start portion, a payload portion, and an end portion, during transmission of the payload portion of the data frame, inserting an in-payload arbitration field into the transmission, continuing transmission of the data frame if the node maintains control of the bus after insertion of the in-payload arbitration field, and halting transmission of the data frame before transmission of the data frame is complete if the node losses control of the bus after insertion of the in-payload arbitration field.

20 Claims, 11 Drawing Sheets

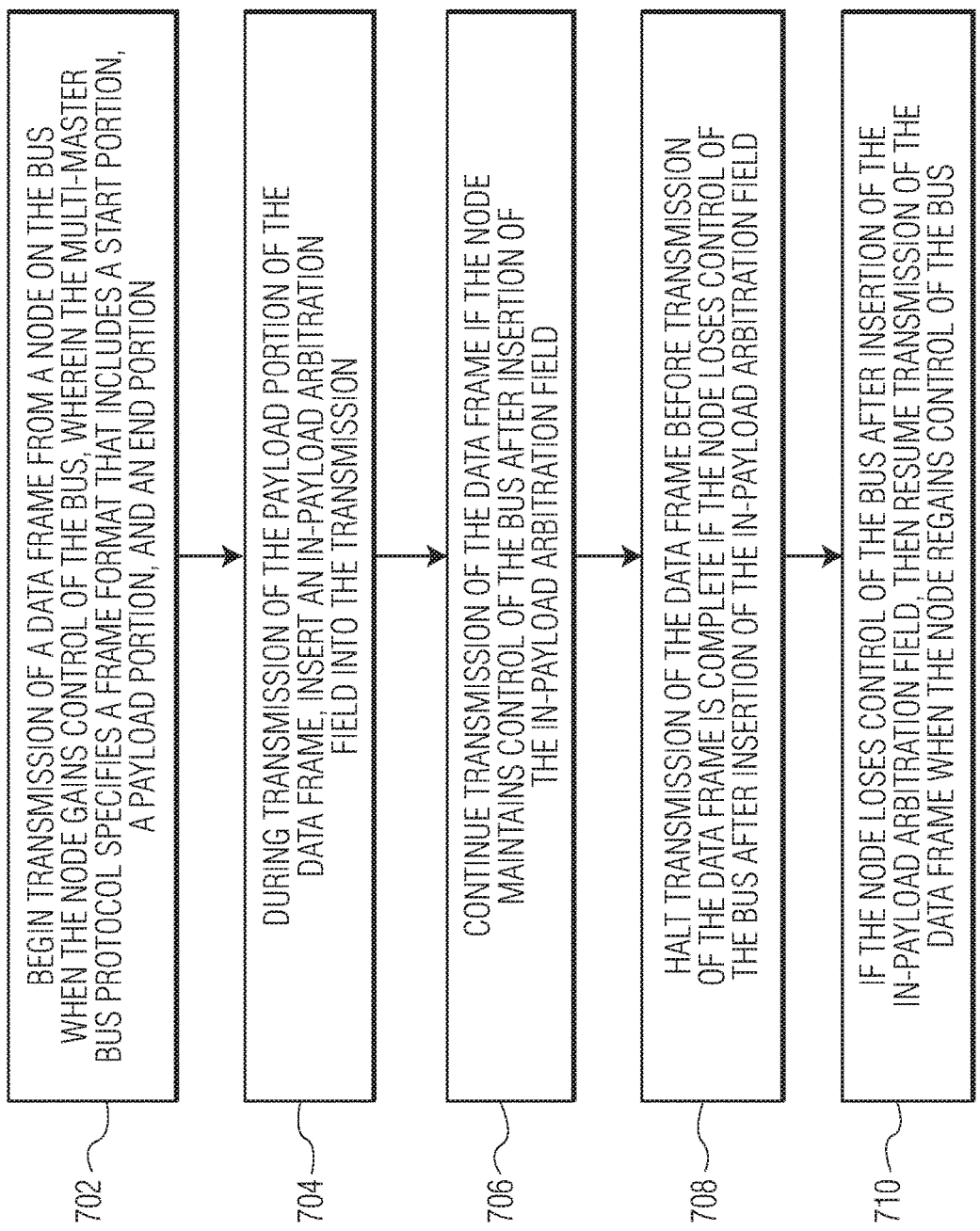

METHOD AND DEVICE FOR COMMUNICATING DATA FRAMES ON A MULTI-MASTER BUS

BACKGROUND

Controller area network (CAN) bus is a message-based "multi-master" communications bus protocol that is often used within automobiles. The CAN bus protocol is used to enable communications between various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The bus protocol is considered a "multi-master" bus protocol because different ECUs on the bus can gain control of the bus according to an arbitration process, e.g., so as to increase the ratio of net payload transmission rate-to-gross data transmission rate.

The data link layer of the CAN protocol is standardized as International Standards Organization (ISO) 11898-1. The standardized CAN data link layer protocol has been extended to provide higher data rates. The extended protocol is referred to as CAN Flexible Data-Rate or "CAN FD." In the future, it may be desirable to increase the data rate by increasing the amount of data that can be carried in each frame. However, increasing the amount of data that can be carried in each frame can negatively affect frame latency.

SUMMARY

Embodiments of a device and method are disclosed. In an embodiment, a method for communicating data frames on a bus that operates according to a multi-master bus protocol is disclosed. The method involves beginning transmission of a data frame from a node on the bus when the node gains control of the bus, wherein the multi-master bus protocol specifies a frame format that includes a start portion, a payload portion, and an end portion, during transmission of the payload portion of the data frame, inserting an in-payload arbitration field into the transmission, continuing transmission of the data frame if the node maintains control of the bus after insertion of the in-payload arbitration field, and halting transmission of the data frame before transmission of the data frame is complete if the node losses control of the bus after insertion of the in-payload arbitration field.

In an embodiment of the method, control of the bus is gained, maintained, and/or lost via arbitration between nodes on the bus. In an embodiment, arbitration involves bitwise arbitration based on an identifier in the start portion of the data frames.

In an embodiment, the in-payload arbitration field is inserted into the payload portion of the data frame based on the maximum amount of time that any one node should be able to tie up the bus by transmitting a single data frame.

In an embodiment, if the node losses control of the bus after insertion of the in-payload arbitration field, then resuming transmission of the data frame when the node regains control of the bus.

In an embodiment, a second node on the bus is configured to begin arbitrating for control of the bus in response to receiving the in-payload arbitration field from the node.

In an embodiment, the bus is a two wire bus. In an embodiment, one of the two wires is driven high and the other wire is driven low to transmit a dominant signal and wherein neither of the two wires is driven high to transmit a recessive signal.

A device for communicating data frames on a bus that operates according to a multi-master bus protocol is also disclosed. The device includes transmission control logic configured to control transmission of a data frame onto the bus. Control of data frame transmission involves beginning transmission of a data frame from a node on the bus when the node gains control of the bus, wherein the multi-master bus protocol specifies a frame format that includes a start portion, a payload portion, and an end portion, during transmission of the payload portion of the data frame, inserting an in-payload arbitration field into the transmission, continuing transmission of the data frame if the node maintains control of the bus after insertion of the in-payload arbitration field, and halting transmission of the data frame before transmission of the data frame is complete if the node losses control of the bus after insertion of the in-payload arbitration field.

In an embodiment, control of the bus is gained, maintained, and/or lost via arbitration between nodes on the bus. In an embodiment, arbitration involves bitwise arbitration based on an identifier in the start portion of the data frames.

In an embodiment, the in-payload arbitration field is inserted into the payload portion of the data frame based on the maximum amount of time that any one node should be able to tie up the bus by transmitting a single data frame.

In an embodiment, the transmission control logic is further configured to, if the node losses control of the bus after insertion of the in-payload arbitration field, then resume transmission of the data frame when the node regains control of the bus.

In an embodiment, an integrated circuit device includes the device described herein.

An apparatus is also disclosed. The apparatus includes a plurality of nodes and a bus connecting the plurality of nodes, wherein the plurality of nodes communicate with each other according to a multi-master bus protocol, and wherein a first node of the plurality of nodes is configured to begin transmission of a data frame from the first node when the first node gains control of the bus, wherein the multi-master bus protocol specifies a frame format that includes a start portion, a payload portion, and an end portion, during transmission of the payload portion of the data frame, insert an in-payload arbitration field into the transmission, continue transmission of the data frame if the first node maintains control of the bus after insertion of the in-payload arbitration field, and halt transmission of the data frame before transmission of the data frame is complete if the first node losses control of the bus after insertion of the in-payload arbitration field, and wherein a second node of the plurality of nodes is configured to begin arbitrating for control of the bus in response to receiving the in-payload arbitration field from the first node.

In an embodiment, the bus is a two wire bus.

In an embodiment, one of the two wires is driven high and the other wire is driven low to transmit a dominant signal and wherein neither of the two wires is driven high to transmit a recessive signal.

In an embodiment, control of the bus is gained, maintained, and/or lost via arbitration between the plurality of nodes on the bus. In an embodiment, arbitration involves bitwise arbitration based on an identifier in the start portion of the data frames. In an embodiment, the second node on the bus is configured to begin transmitting a data frame upon winning the arbitration and the first node is configured to resume transmitting the data frame from the first node when control of the bus is regained.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 7 is a process flow diagram of a technique for communicating data frames on a bus that operates according to a multi-master bus protocol.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
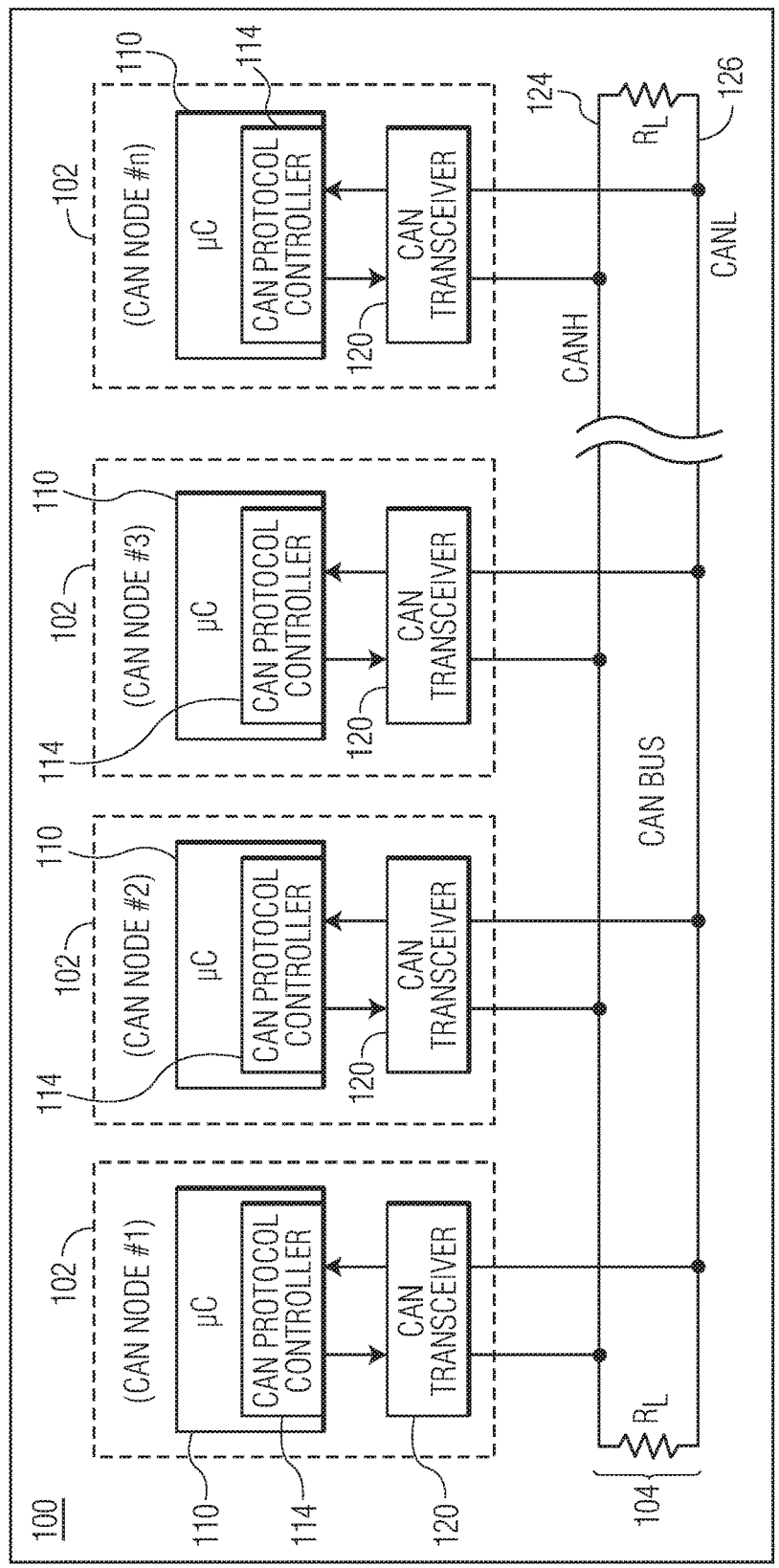
FIG. 1 depicts a CAN network that includes multiple CAN nodes connected to a CAN bus.

FIG. 1 depicts a CAN network 100 that includes multiple CAN nodes 102, also referred to as "ECUs," each connected to a CAN bus 104. In the embodiment of FIG. 1, each CAN node includes a microcontroller 110 having an embedded CAN protocol controller 114 and a CAN transceiver 120. The microcontrollers are typically connected to at least one device (not shown) such as a sensor, an actuator, or some other control device and are programmed to determine the meaning of received messages and to generate appropriate outgoing messages. The microcontrollers, also referred to as host processors, hosts, or digital signal processors (DSPs), are known in the field. In an embodiment, the host supports application software that interacts with the CAN protocol controller.

The CAN protocol controllers 114, which can be embedded within the microcontrollers 110 or external to the microcontrollers (e.g., a separate IC device), implement data link layer operations as is known in the field. For example, in receive operations, a CAN protocol controller stores received serial bits from the transceiver until an entire message is available for fetching by the microcontroller. The CAN protocol controller can also decode the CAN messages according to the standardized frame format of the CAN protocol. In transmit operations, the CAN protocol controller receives messages from the microcontroller and transmits the messages as serial bits in the CAN frame format to the CAN transceiver.

The CAN transceivers 120 are located between the microcontrollers 110 and the CAN bus 104 and implement physical layer operations. For example, in receive operations, a CAN transceiver converts analog differential signals from the CAN bus to serial digital signals that the CAN protocol controller 114 can interpret. The CAN transceiver also protects the CAN protocol controller from extreme electrical conditions on the CAN bus, e.g., electrical surges. In transmit operations, the CAN transceiver converts serial digital bits received from the CAN protocol controller into analog differential signals that are sent on the CAN bus.

The CAN bus 104 carries analog differential signals and includes a CAN high (CANH) bus line 124 and a CAN low (CANL) bus line 126. The CAN bus is known in the field.

Figure 2:
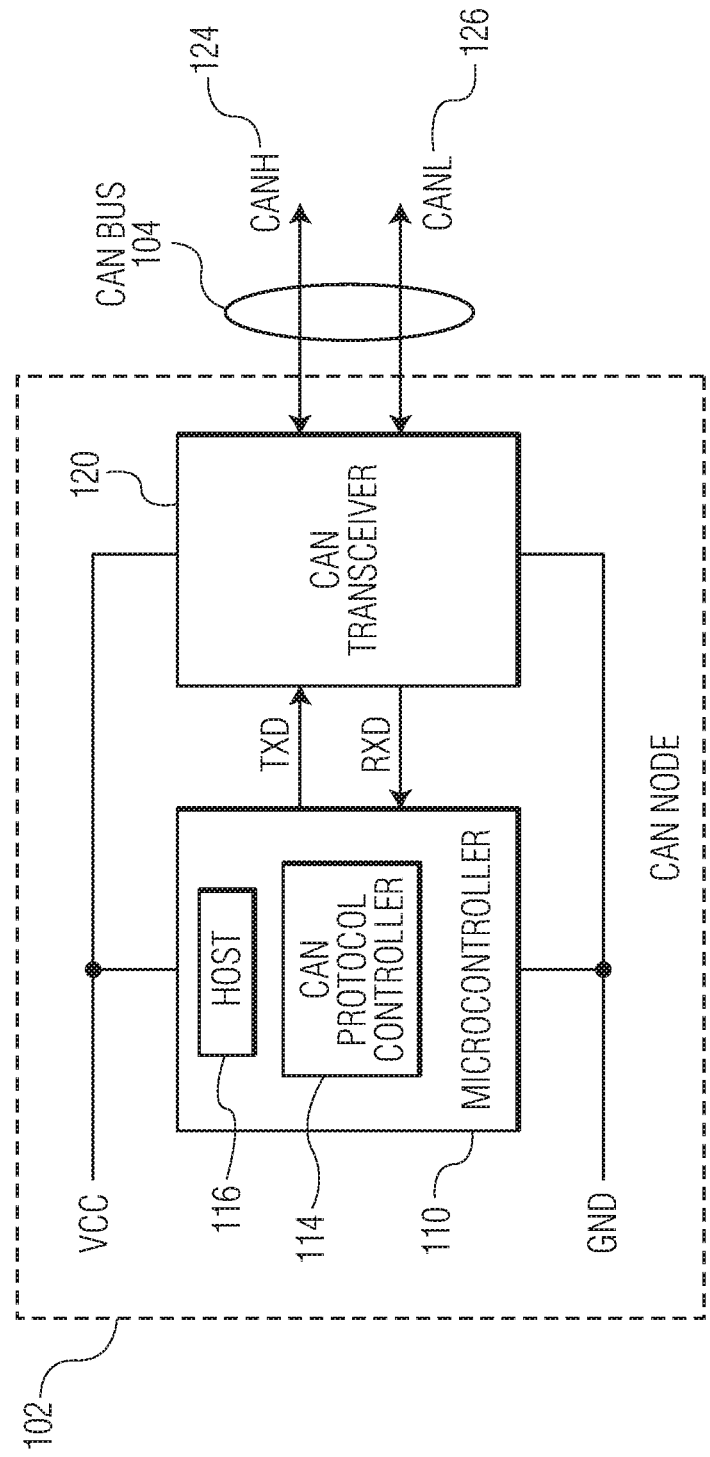
FIG. 2 depicts an expanded view of one CAN node from FIG. 1.

FIG. 2 depicts an expanded view of one CAN node 102 from FIG. 1. In the expanded view of FIG. 2, the microcontroller includes a host 116, which may be, for example, a software application that is stored in memory of the microcontroller and executed by processing circuits of the microcontroller. The microcontroller 110 and the CAN transceiver 120 of the CAN node are connected between a supply voltage, $V_{CC}$, and ground, GND. As illustrated in FIG. 2, data communicated from the microcontroller to the CAN transceiver is identified as transmit data (TXD) and data communicated from the CAN transceiver to the microcontroller is referred to as receive data (RXD). Throughout the description, TXD is carried on a TXD path and RXD is carried on an RXD path. Data is communicated to and from the CAN bus via the CANH and CANL bus lines 124 and 126, respectively.

As noted above, the CAN protocol controller 114 can be configured to support the normal mode or the flexible data rate mode. As used herein, "CAN normal mode" (also referred to as "Classical CAN mode") refers to frames that are formatted according to the ISO 11898-1 standard and "CAN FD mode" refers to frames that are formatted according to the emerging ISO/Draft International Standard (DIS) 11898-1 standard, or an equivalent thereof.

Figure 3A:
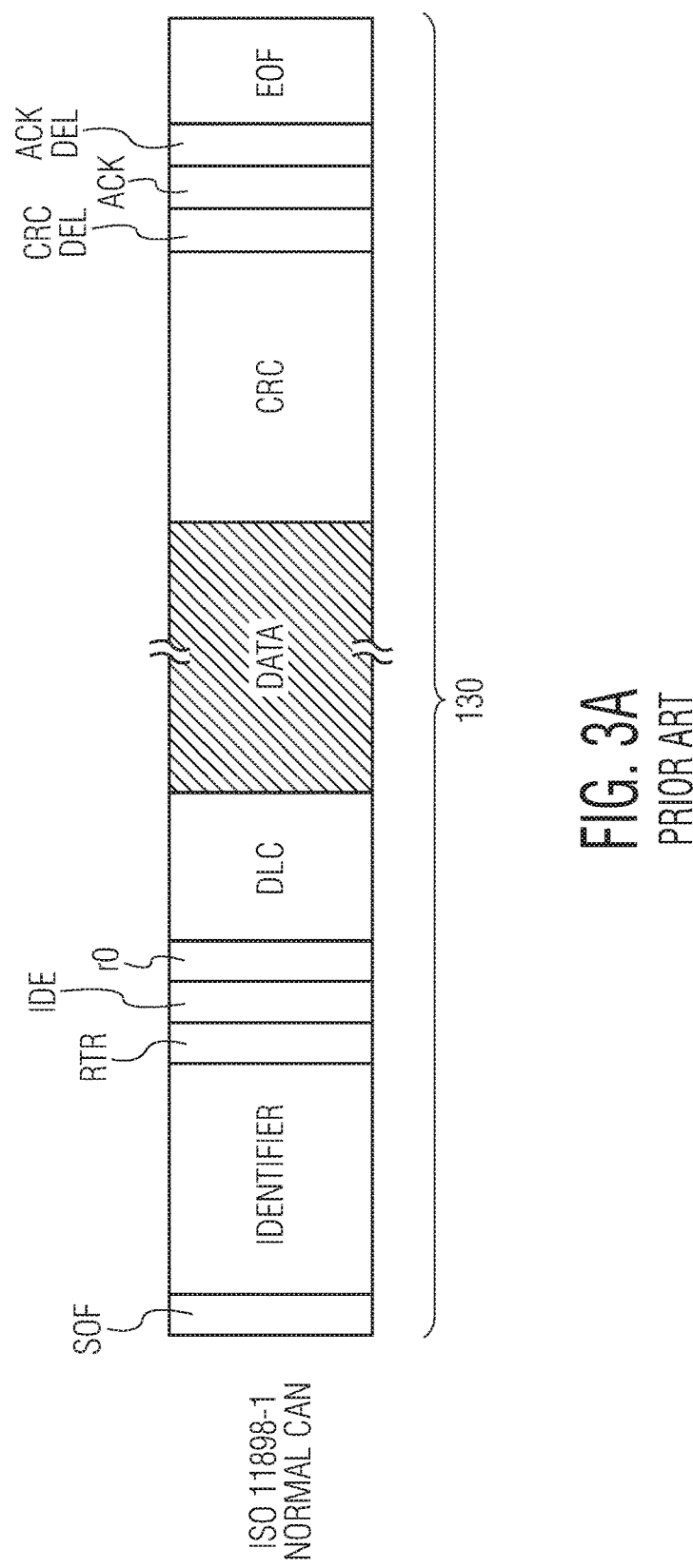
FIG. 3A depicts the format of an ISO 11898-1 frame that is used in CAN normal mode.
Figure 3B:
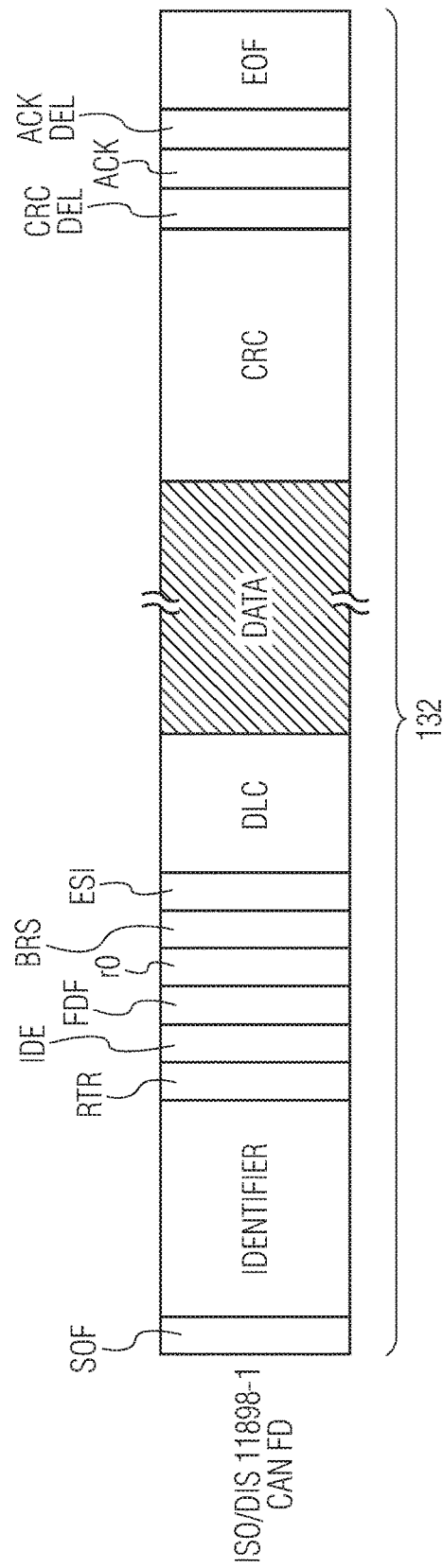
FIG. 3B depicts the format of an ISO 11898-1 frame that is used in CAN FD mode.

FIG. 3A depicts the format of an ISO 11898-1 frame 130 (in the classical base frame format (CBFF) or standard format) that is used in CAN normal mode and FIG. 3B depicts the format of an ISO/DIS 11898-1 frame 132 (in the FD base frame format or FBFF) that is used in CAN FD mode. The fields of the CAN normal mode and CAN FD mode frames are defined as follows:

SOF Start of Frame (always dominant)
IDENTIFIER Identifier Bits, defining the message content
RTR Remote transmission Request
IDE ID Extension
r0 Reserved Bit 0 (replaced by FDF in the CAN FD format)
FDF FD Format (this is the bit distinguishing the frame formats)
BRS Baud Rate Switch
ESI Error State Indicator
DLC Data Length Code
Data Data Bytes
CRC Cyclic Redundancy Check
CRC Del CRC Delimiter (always recessive)
ACK Acknowledge
ACK Del Acknowledge Delimiter
EOF End Of Frame There is also another version of the classical frame format, referred to as "classical extended frame format (CEFF)," in which the FDF bit is in the old r1 position, whereas the FDF bit is in the r0 position in CBFF. There is also a "FD extended frame format (FEFF)," where "extended" refers to a 29-bit identifier. Of note, the CAN protocols use the reserved bit (r0 or r1) (also referred to generally as the FDF bit) within a CAN frame to identify a frame as a CAN FD mode frame. In particular, the FDF bit is a 1-bit field that indicates whether the frame is a CAN normal mode frame (ISO 11898-1) or a CAN FD mode frame (ISO/DIS 11898-1). When the FDF bit is dominant (e.g., low or "0"), the frame is a CAN normal mode frame and when the FDF bit is recessive (e.g., high or "1"), the frame is a CAN FD mode frame. In a CAN normal mode frame, the reserved bits (r0, r1) are always driven dominant to the bus lines.

CAN messages are broadcast messages and the identifier is unique to the sender CAN node. The CAN protocol controllers of the receiving CAN nodes have identifier filters that are "tuned" to certain identifiers to make sure that the host receives relevant messages and is not bothered with irrelevant messages. Standard CAN frames have an 11-bit IDENTIFIER field to carry an 11-bit identifier and extended CAN frames have a 29-bit IDENTIFIER field to carry a 29-bit identifier. The IDENTIFIER field of a standard CAN frame is depicted in FIG. 3A and the IDENTIFIER field of an extended CAN frame is depicted in FIG. 3B. The 29-bit IDENTIFIER field is divided into two sections, an 11-bit base IDENTIFIER field and an 18-bit extended IDENTIFIER field.

As noted above, the CAN bus protocol is a "multi-master" bus protocol in which any of the nodes on the bus can gain control of the bus and transmit a frame while the node has control of the bus. According to the CAN bus protocol, control of the bus is determined by an arbitration process in which the bus with the highest priority gains control of the bus and gets the right to transmit. Priority is determined by the value of the IDENTIFIER and conflicts between nodes on the bus are resolved by a bitwise arbitration process in which the bus level (either dominant or recessive) is observed bit-by-bit at each node. All nodes that are transmitting a recessive bit while detecting a dominant bit lose arbitration and transition into a listening mode. After transmission of all of the IDENTIFIER bits, only one node is still in transmission mode and all of the other nodes are in listening mode. According to the CAN bus protocol, once a node gains control of the bus, the node is free to transmit the entire CAN message, also referred to herein as a data frame.

Figure 3C:
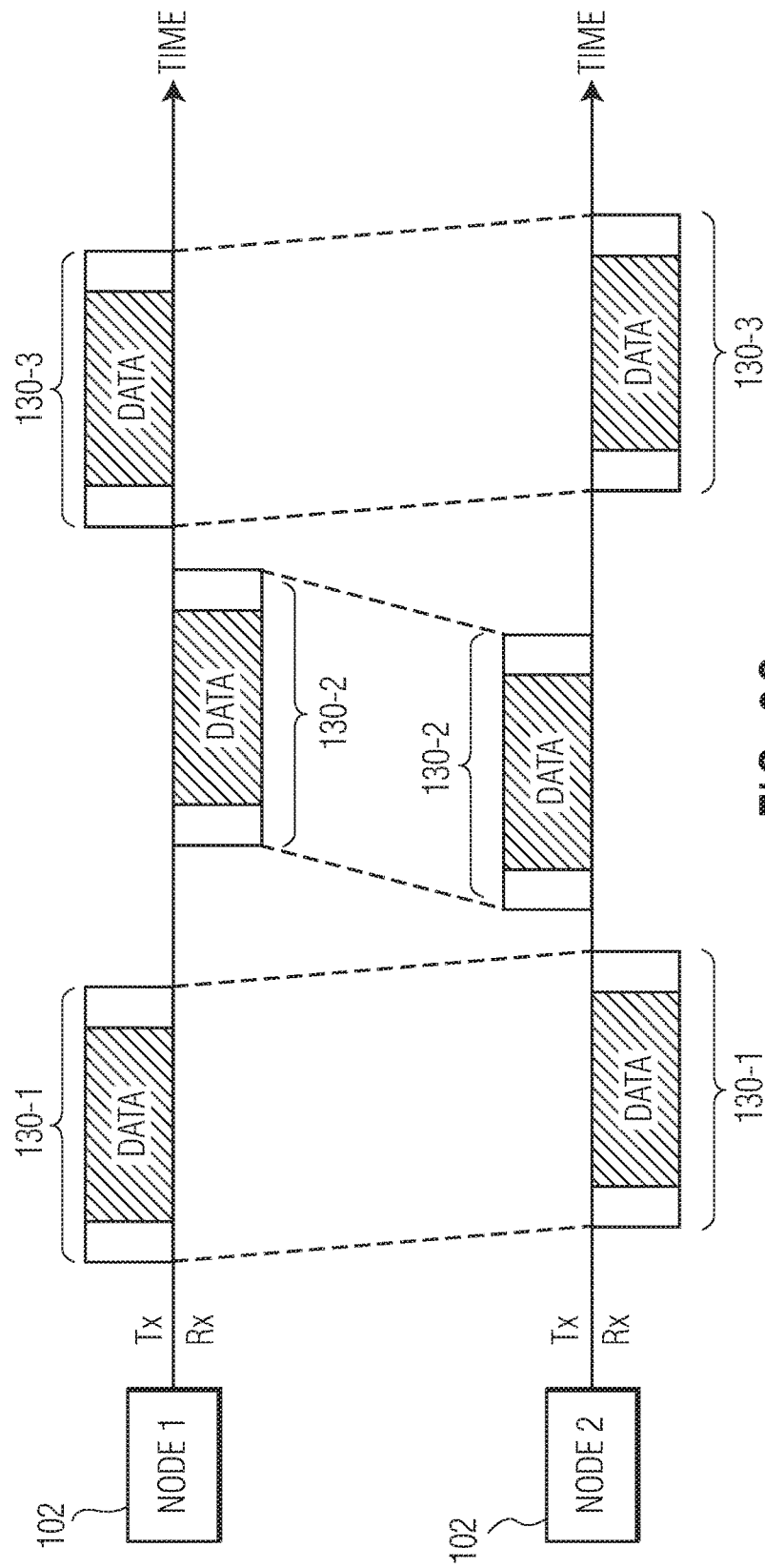
FIG. 3C illustrates an example of communication of frames between two nodes on a bus using, for example, the CAN protocol.

FIG. 3C illustrates synchronized timelines of the communication of frames 130-1-130-3 between two nodes 102 on a bus using, for example, the CAN protocol. With reference to FIG. 3C, node 1 gains control of the bus and transmits a first data frame 130-1 on the bus. Transmission of the first data frame by node 1 is indicated by the first data frame being located above the node 1 timeline. After some transmission delay, node 2 receives the first data frame as indicated by the first data frame being located below the node 2 timeline. After transmission of the first data frame is complete, node 2 gains control of the bus. If there is contention on the bus, node 2 gains control of the bus by winning the arbitration process and if there is not contention on the bus, node 2 gains control of the bus. After gaining control of the bus, node 2 transmits a second data frame 130-2 on the bus. Transmission of the second data frame by node 2 is indicated by the second data frame being located above the node 2 timeline. After some transmission delay, node 1 receives the second data frame as indicated by the second data frame being located below the node 1 timeline. After transmission of the second data frame is complete, node 1 gains control of the bus again, e.g., by winning the arbitration process. After gaining control of the bus again, node 1 transmits a third data frame 130-3 on the bus. Transmission of the third data frame by node 2 is indicated by the third data frame being located above the node 2 timeline. After some transmission delay, node 2 receives the third data frame as indicated by the third data frame being located below the node 2 timeline.

As noted above, in the future, it may be desirable to increase the data rate on a multi-master bus by increasing the amount of data that can be carried in each frame. For example, it may be possible to modify the CAN bus protocol to increase the number of bytes that can be carried in the data field (i.e., the payload field) of a single data frame. However, increasing the amount of data that can be carried in the data field of a data frame on a CAN or "CAN-like" bus can negatively affect frame latency. For example, the CAN protocol has an expected maximum latency of no more than 1 millisecond (ms). Increasing the amount of data that can be carried in the data field of a single data frame could cause the maximum latency to exceed 1 ms, which may not be acceptable in certain applications, such as safety related applications.

In an embodiment in accordance with the invention a technique for communicating data frames on a bus that operates according to a multi-master bus protocol involves beginning transmission of a data frame from a node on the bus when the node gains control of the bus, wherein the multi-master bus protocol specifies a frame format that includes a start portion, a payload portion, and an end portion, during transmission of the payload portion of the data frame, inserting at least one in-payload arbitration field into the transmission, continuing transmission of the data frame if the node maintains control of the bus after insertion of the in-payload arbitration field, and halting transmission of the data frame before transmission of the data frame is complete if the node losses control of the bus after insertion of the in-payload arbitration field.

In an embodiment, the in-payload arbitration field is inserted if the payload portion of the data frame exceeds a certain predetermined size (e.g., in bytes). For example, the in-payload arbitration field is inserted after approximately 500 bytes (e.g., (500 bytes×8 bits/byte)/4 Mbps=1 ms) of the payload portion so that no more than 500 bytes of the payload portion are transmitted before a window of opportunity for arbitration occurs. In an embodiment, the maximum number of bytes in the payload portion that are transmitted before an in-payload arbitration field is inserted into the transmission is determined based on the maximum amount of time that any one node should be able to tie up the bus (i.e., latency) by transmitting a single data frame. In an embodiment, the predetermined size is a function of the maximum amount of time between arbitration windows (i.e., maximum latency) and the transmission rate. For example, the predetermined size can be determined as:

predetermined size (bytes)=transmission rate (bytes/sec)*max latency (sec)

Other parameters, such as, the total number of data bytes to be transmitted and/or the priority of a data frame may be considered in determining when and/or where to insert an in-payload arbitration field into the payload field of a data frame. In an example, fewer in-payload arbitration fields may be inserted into relatively high priority frames as the high priority frames would likely maintain control of the bus if an in-payload arbitration process were to be triggered. In an embodiment, the in-payload arbitration field is inserted later in the payload field for higher priority frames and sooner in the payload field for lower priority frames. If the payload portion of a data frame is small enough (e.g., below the predetermined size in bytes), then there is no need to insert an in-payload arbitration field into the payload portion of the data frame during transmission of the data frame. For example, for CAN normal frames, there is no need to insert an in-payload arbitration field into data fields of 8 bytes or less because the CAN bus protocol is designed to meet the latency requirement with an 8 byte payload. Likewise, for CAN FD frames, there is no need to insert an in-payload arbitration field into data fields of 64 bytes or less because the CAN bus protocol is designed to meet the latency requirement with an 64 byte payload.

It should be noted that the technique described herein is applicable to multi-master bus protocols in general, and, for example, to serial bus protocols that are used for in-vehicle networks, and where the physical layer is configured to implement collision detection and arbitration amongst the nodes on the bus similar to, for example, the CAN bus protocol. The CAN bus protocol is described with reference to FIGS. 1-3C as an example of a widely used multi-master bus protocol to provide context for the description. The technique for inserting an in-payload arbitration field could be applied to a bus protocol that utilizes, for example, physical layer signaling similar to the CAN bus protocol.

By inserting an arbitration field into the transmission of the payload portion (i.e., the "data field" in a "CAN-like" bus protocol) of a data frame, the bus is not tied up by a lower priority node for an extended period of time because a higher priority node is able to gain control of the bus during an arbitration process that is triggered by the in-payload arbitration field. Thus, the in-payload arbitration field effectively creates arbitration windows during transmission of the payload portion of a data frame so that a higher priority data frame can be transmitted and a large lower priority data frame does not control the bus for too long. Additionally, because the in-payload arbitration field is inserted into the payload field of a data frame, the technique can be integrated with an existing multi-master bus protocol, while keeping many features of the protocol intact. In an embodiment, a multi-master bus protocol, such as the CAN bus protocol, could be adapted to use an in-payload arbitration field as described herein.

Figure 4A:
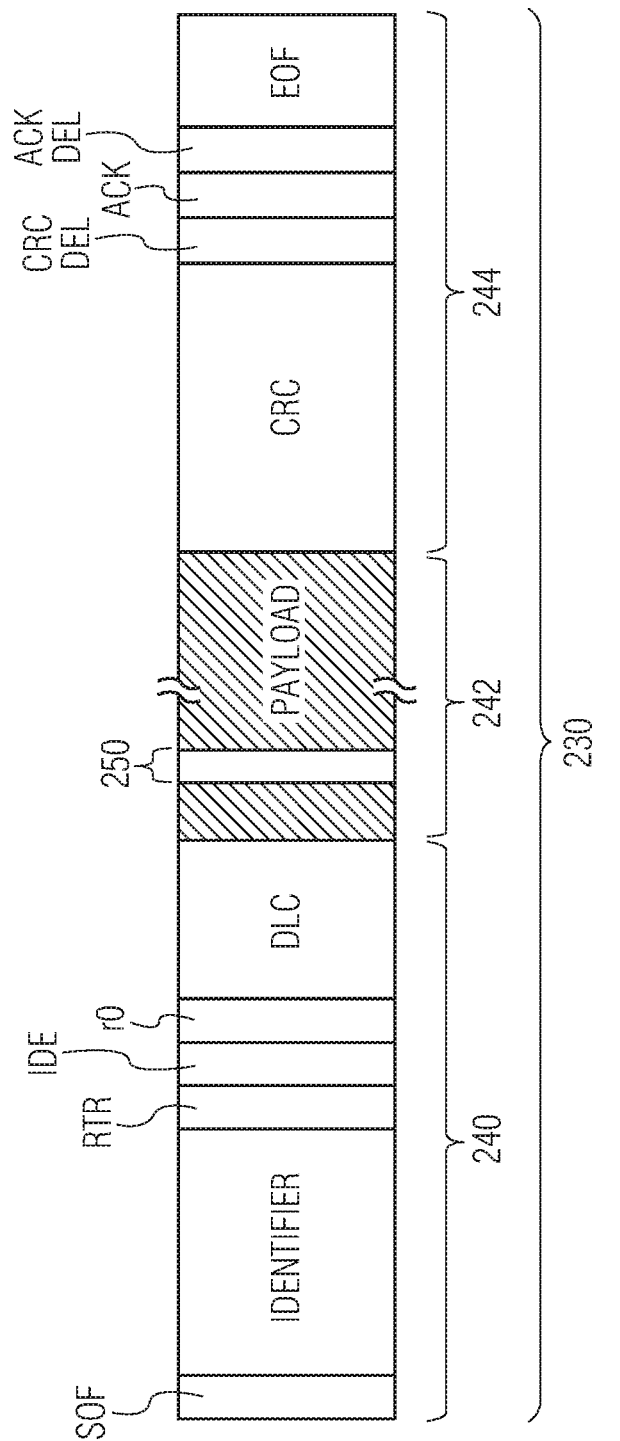
FIG. 4A depicts a frame format that is similar to the frame format of FIG. 3A, which includes an in-payload arbitration field inserted into the data field of the frame.

FIG. 4A depicts a frame format, which is similar to the frame format of FIG. 3A, that includes an in-payload arbitration field inserted into the payload/data field of the frame. As shown in FIG. 4A, the data frame 230 includes a start portion 240, a payload portion 242, and an end portion 244. The start portion 240 includes an SOF field, an IDENTIFIER field, an RTR field, an IDE field, an r0 field, and a DLC field and the end portion 244 includes a CRC field, a CRC DEL field, an ACK field, an ACK DEL field, and an EOF field. Although an example format is shown, other formats that include a start portion, a payload portion, and an end portion are possible. The payload portion 242 of the data frame 230 includes an in-payload arbitration field 250 located within the data field. In an embodiment, "inserting" the in-payload arbitration field into the data field involves transmitting bits of the arbitration field instead of transmitting bits of the data field. Insertion of the in-payload arbitration field into the transmission of the data frame signals to the other nodes on the bus that the bus is open for arbitration. In an embodiment, the in-payload arbitration field includes a bit pattern (e.g., of at least one fixed bit) that indicates the start of an in-payload arbitration process, followed by a bit pattern (e.g., at least one bit) that is allowed to be destroyed by a collision that is caused by a node or nodes that want to gain access to the bus. In the case in which a collision is detected, arbitration takes place and the winning node starts/continues transmission. In the case in which no collision is detected, the transmitting node continues transmission of the data field.

Figure 4B:
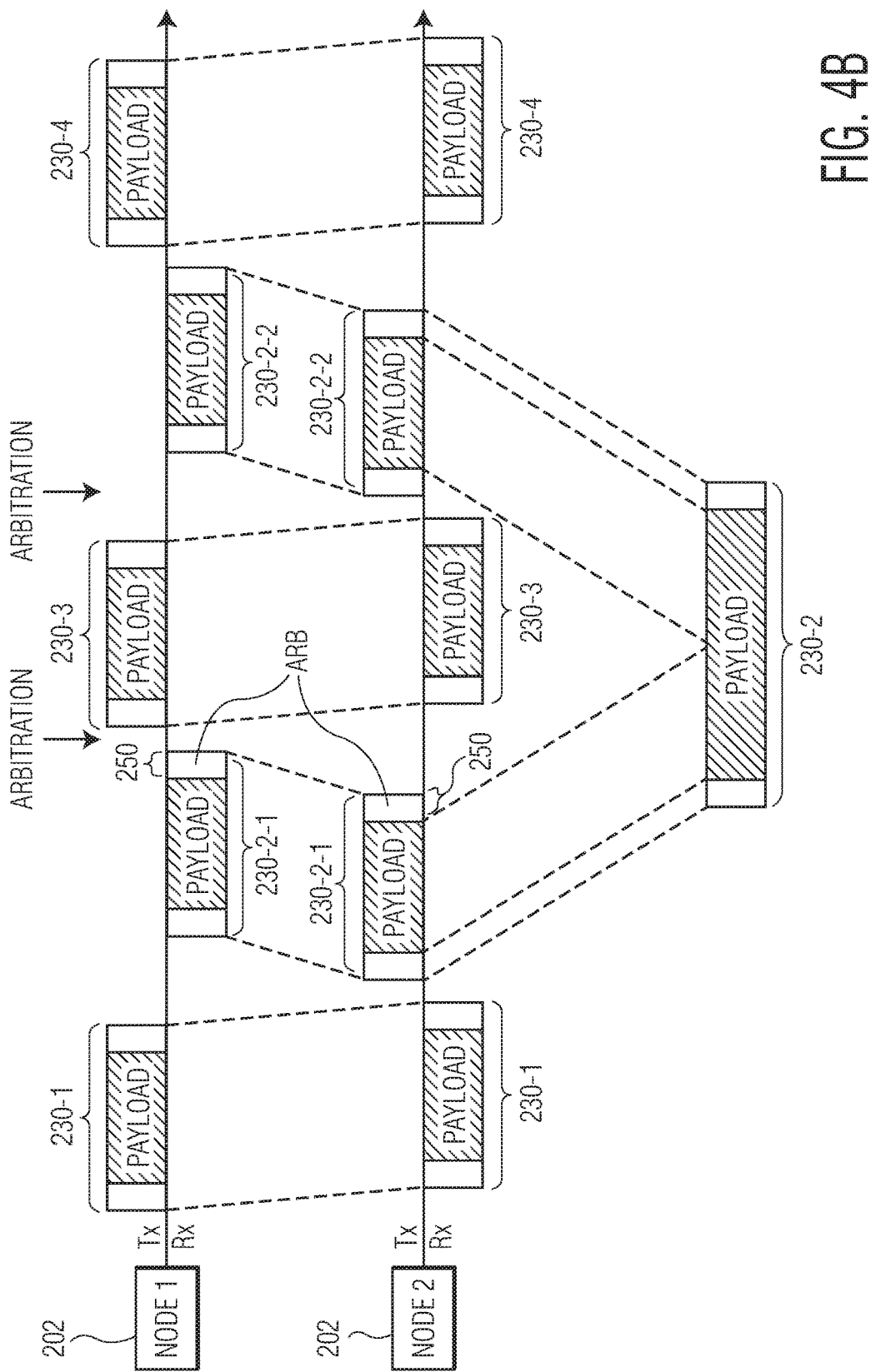
FIG. 4B illustrates an example of communication of frames between two nodes on a bus using a multi-master bus protocol that includes an in-payload arbitration field in the payload field of the frame.

FIG. 4B illustrates the communication of frames between two nodes 202 on a bus using, for example, a multi-master bus protocol in which an in-payload arbitration field is inserted into the payload field of a frame. With reference to FIG. 4C, node 1 gains control of the bus and transmits a first data frame 230-1 on the bus. Transmission of the first data frame by node 1 is indicated by the first data frame being located above the node 1 timeline. In this example, the first data frame is small enough that an in-payload arbitration field is not inserted into the payload field of the data frame during transmission. After some transmission delay, node 2 receives the first data frame as indicated by the first data frame being located below the node 2 timeline. After transmission of the first data frame is complete, node 2 gains control of the bus. If there is contention on the bus, node 2 gains control of the bus by winning the arbitration process. After gaining control of the bus, node 2 transmits a second data frame 230-2 on the bus. In this example, the second data frame is large enough that an in-payload arbitration field is inserted into the payload field of the data frame and transmitted on the bus before transmission of the entire data frame is complete (e.g., a first portion of the data frame 230-2-1). Transmission of the second data frame by node 2 is indicated by the second data frame being located above the node 2 timeline. After some transmission delay, node 1 receives the second data frame as indicated by the second data frame being located below the node 1 timeline. Because node 2 has transmitted the in-payload arbitration field 250, an arbitration process is triggered on the bus. Thus, the in-payload arbitration field opens an arbitration window that prevents node 2 from occupying the bus for too long. In this example, node 1 gains control of the bus again, e.g., by winning the arbitration process. After gaining control of the bus again, node 1 transmits a third data frame 230-3 on the bus. Transmission of the third data frame by node 2 is indicated by the third data frame being located above the node 2 timeline. After some transmission delay, node 2 receives the third data frame as indicated by the third data frame being located below the node 2 timeline. After the third data frame is completely received, node 2 regains control of the node, e.g., either by winning arbitration or because the bus is available. Node 2 then resumes sending a second portion (e.g., the remaining portion) of the second data frame 230-2-2. For example, node 2 appends a new header on the data frame and begins transmitting the payload field at the point in the payload field where transmission was previously halted, e.g., at the point where the in-payload arbitration field was inserted. Transmission of the second portion of the second data frame by node 2 is indicated by the second portion of the second data frame being located above the node 2 timeline. After some transmission delay, node 1 receives the second portion of the second data frame as indicated by the second portion of the second data frame being located below the node 1 timeline. Transmission of the second data frame 230-2 on the bus is now complete. After transmission of the second data frame is complete, node 1 gains control of the bus again, e.g., by winning the arbitration process or because the bus is available. After gaining control of the bus again, node 1 transmits a fourth data frame 230-4 on the bus. Transmission of the fourth data frame by node 2 is indicated by the fourth data frame being located above the node 2 timeline. Although the technique is described herein with respect to a multi-master bus protocol that is similar to the CAN bus protocol, the technique is applicable to other multi-master bus protocols, including other existing multi-master bus protocols and multi-master bus protocols that may be developed in the future. For example, the technique for inserting an in-payload arbitration field into a data frame is applicable to other serial data protocols that provide collision detection and arbitration at the physical level.

As described above, transmission of the second frame from node 2 is resumed from the point in the payload where transmission was halted. However, in other embodiments, transmission could be resumed from some other point. Alternatively, the second data frame could be resent completely, such that the second data frame will be repeatedly resent until the bus is open for long enough to receive the entire frame. That is, the entire second data frame will continue to be resent with the in-payload arbitration field until the node transmits the data frame without losing arbitration.

Figure 5A:
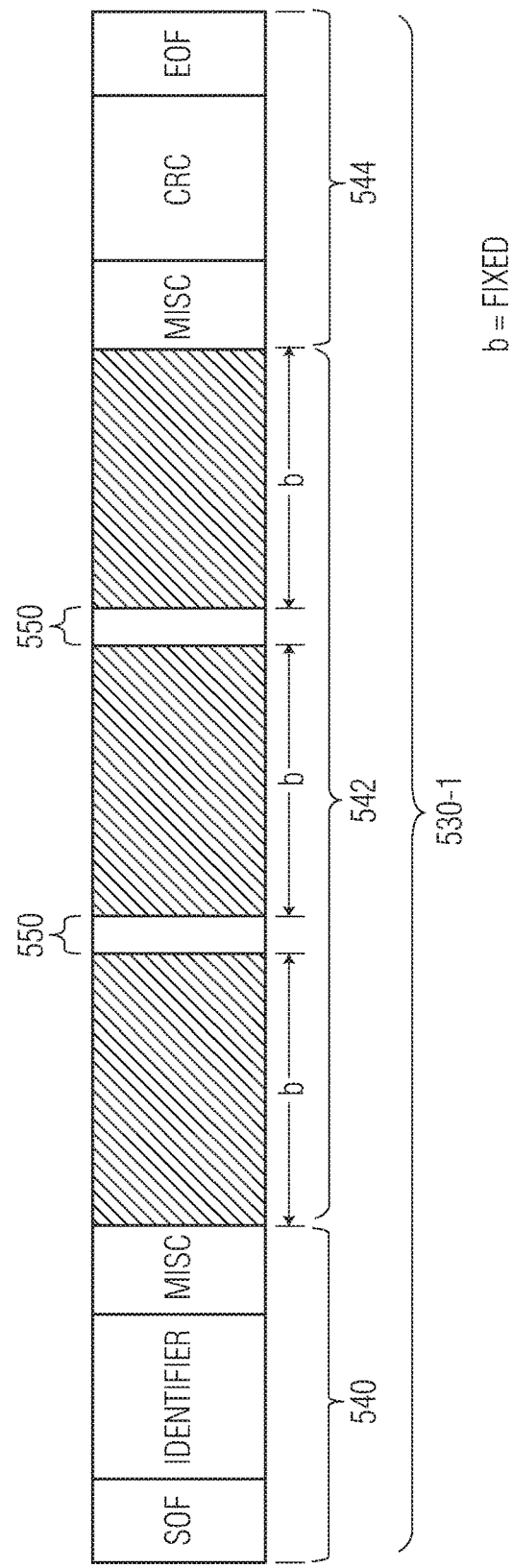
FIG. 5A depicts an example of a frame format for a multi-master bus protocol that includes multiple in-payload arbitration fields inserted into the payload field of the frame.

FIG. 5A depicts an example of a frame format for a multi-master bus protocol that includes multiple in-payload arbitration fields inserted into the payload field of the frame. In the example of FIG. 5A, the data frame 530-1 includes a start portion 540 having a start-of-frame (SOF) field, an identifier field, a first miscellaneous field, a payload portion 542 having a data/payload field and at least one in-payload arbitration field 550, and an end portion 544 having a second miscellaneous field, and CRC field, and an end-of-frame (EOF) field. As shown in FIG. 5A, the payload portion includes two in-payload arbitration fields 550 inserted into the data/payload field of the payload portion 542. The in-payload arbitration fields are inserted after "b" bytes of data in the data/payload field. The miscellaneous fields may be used for implementation of the multi-master bus protocol such as, for example, fields in the CAN bus protocol.

Figure 5B:
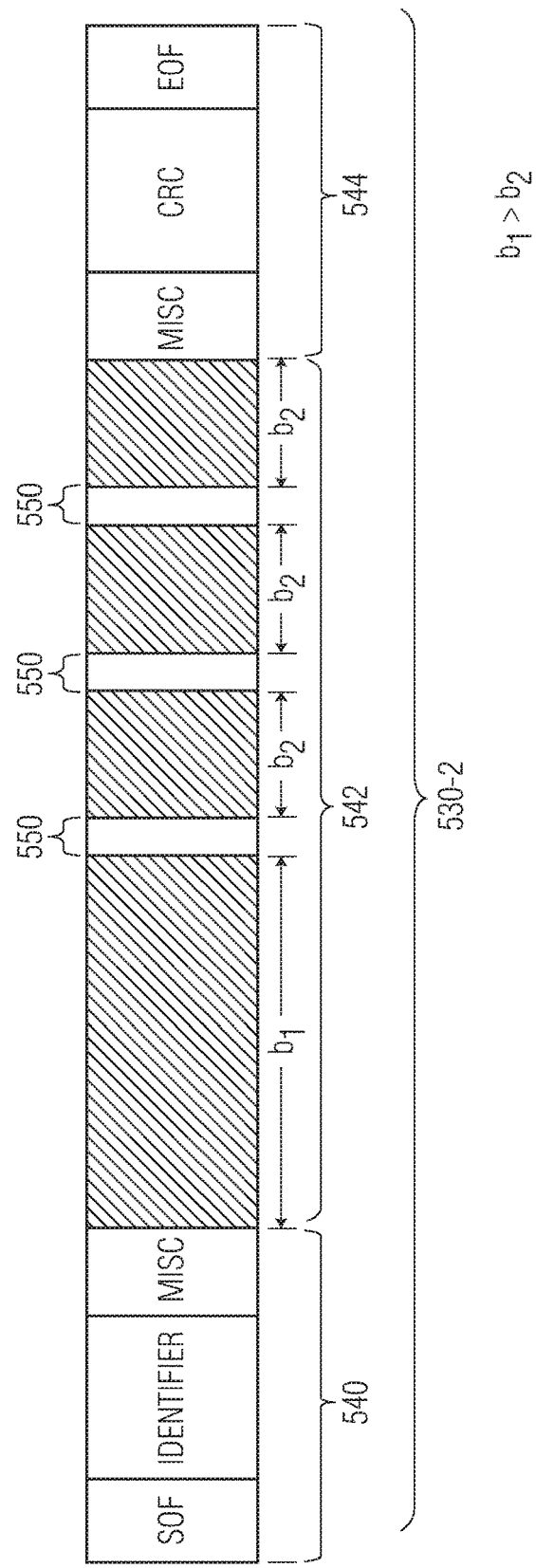
FIG. 5B depicts another example of a frame format for a multi-master bus protocol that includes multiple in-payload arbitration fields inserted into the payload field of the frame.

FIG. 5B depicts another example of a frame format for a multi-master bus protocol that includes multiple in-payload arbitration fields inserted into the payload field of the frame. In the example of FIG. 5B, the data frame 530-2 includes a start portion 540 having a start-of-frame (SOF) field, an identifier field, a first miscellaneous field, a payload portion 542 having a data/payload field and at least one in-payload arbitration field 550, and an end portion 544 having a second miscellaneous field, and CRC field, and an end-of-frame (EOF) field. As shown in FIG. 5B, the payload portion includes three in-payload arbitration fields 550 inserted into the data/payload field of the payload portion. The first in-payload arbitration field is inserted after "$b_1$" bytes of data in the data/payload field and the next two in-payload arbitration fields are inserted after "$b_2$" bytes, where $b_1 > b_2$. In an embodiment, changing the spacing of the in-payload arbitration fields may ensure that a minimum number of bytes (e.g., $b_1$) can be transmitted without interruption, while from the point in time when transmission of high priority messages may face too long of latency, the opportunity to win arbitration will occur at a reasonable frequency (e.g., every $b_2$ bytes).

Although two techniques for inserting multiple in-payload arbitration fields per data frame are described other techniques are possible.

In an embodiment, the above-described features are embodied in transmission control logic that is included in the nodes that are connected to a bus. The transmission control logic may include hardware, software, firmware, or a combination thereof. In an embodiment, the transmission control logic includes logic to control the insertion of in-payload arbitration fields during transmission of data frames, logic to recognize in-payload arbitration fields during receiving of data frames (e.g., during "listening" phase), and logic to trigger a node to participate in an arbitration process. The transmission control logic may be included in various components of a node.

Figure 6:
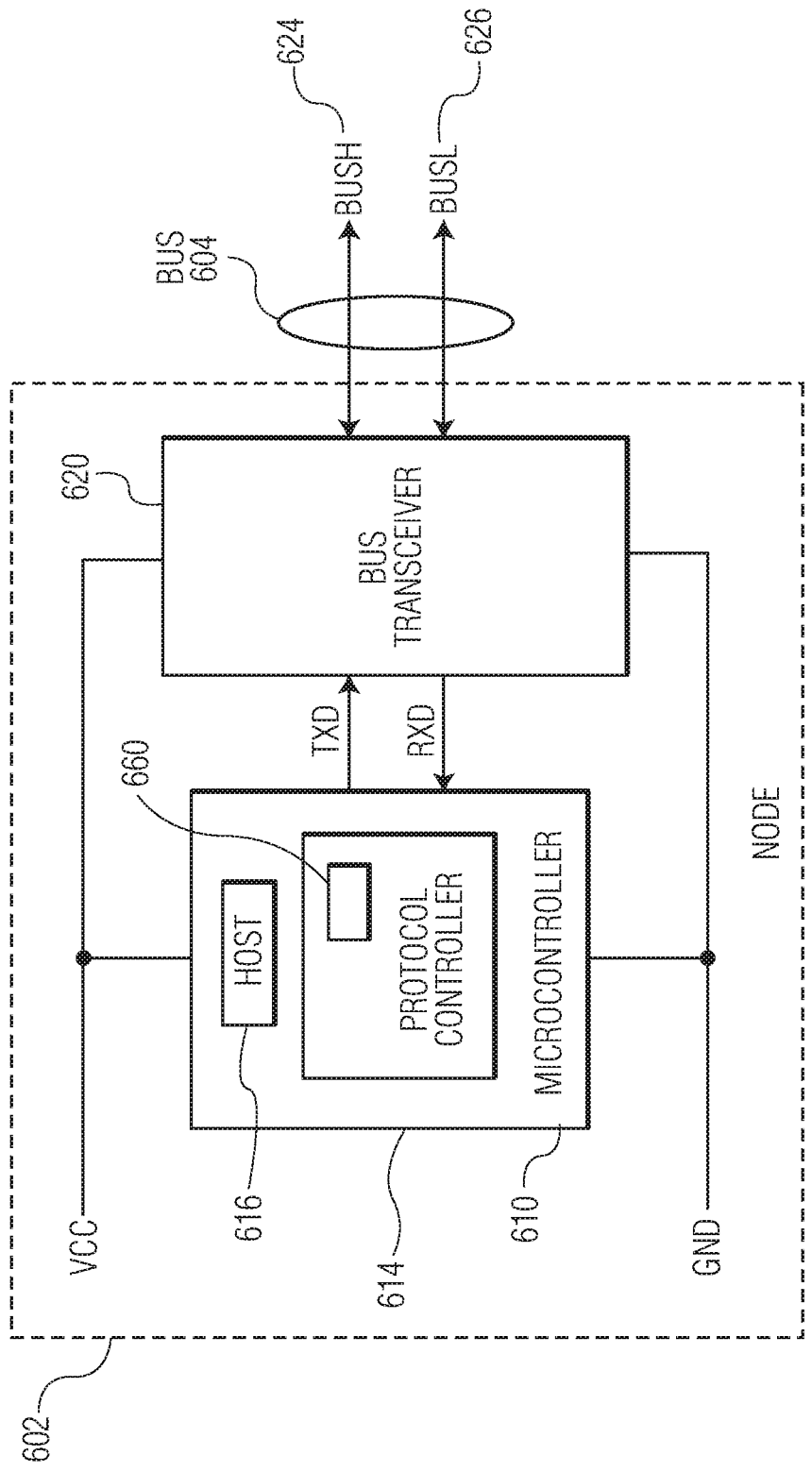
FIG. 6 depicts an embodiment of a node on a bus that is configured to support a multi-master bus protocol that includes an in-payload arbitration field in the payload field of the frame.

FIG. 6 depicts an embodiment of a node 602 on a bus that is configured to support a multi-master bus protocol and that includes transmission control logic configured to insert an in-payload arbitration field into the payload field of data frame as described above. The node 602 includes a bus transceiver 620 that connects to a bus 604 (having busH 624 and busL 626) and a microcontroller 610 that includes a protocol controller 614 and a host 616. In the embodiment of FIG. 6, transmission control logic 660 is included in the protocol controller 614 of the microcontroller 610, where elements of the node may be similar to the CAN node 102 described above with reference to FIG. 2.

FIG. 7 is a process flow diagram of a technique for communicating data frames on a bus that operates according to a multi-master bus protocol. At block 702, transmission of a data frame is begun from a node on the bus when the node gains control of the bus, wherein the multi-master bus protocol specifies a frame format that includes a start portion, a payload portion, and an end portion. At block 704, during transmission of the payload portion of the data frame, an in-payload arbitration field is inserted into the transmission. At block 706, transmission of the data frame is continued if the node maintains control of the bus after insertion of the in-payload arbitration field. At block 708, transmission of the data frame is halted before transmission of the data frame is complete if the node losses control of the bus after insertion of the in-payload arbitration field. In addition, at block 710, if the node losses control of the bus after insertion of the in-payload arbitration field, then transmission of the data frame is resumed when the node regains control of the bus.

Although the technique is described herein with respect to the CAN bus protocol, the technique is applicable to other multi-master bus protocols, including other existing multi-master bus protocols and multi-master bus protocols that may be developed in the future.

As described above with reference to FIGS. 1 and 2, CAN nodes typically include a CAN transceiver, a CAN protocol controller, and a host. Often times the CAN transceiver is embodied as a separate IC device, the CAN protocol controller and host are embodied as a separate microcontroller IC device, and the transceiver IC and the microcontroller are connected to each other by a printed circuit board to form the CAN node. Although a couple of examples of integration are described, the above-described components can be integrated in various different ways. For example, the transmission control logic 660 described with reference to FIG. 6 can be integrated with the protocol controller 614. In an embodiment, the above-described multi-master bus control techniques can be implemented in a device such as a transceiver IC device, a microcontroller IC device, or an IC device that includes both a transceiver and a microcontroller.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for communicating data frames on a bus that operates according to a multi-master bus protocol, the method comprising:
    beginning transmission of a data frame from a node on the bus when the node gains control of the bus, wherein the multi-master bus protocol specifies a frame format that includes a start portion, a payload portion, and an end portion;
    during transmission of the payload portion of the data frame, inserting an in-payload arbitration field into the transmission;
    continuing transmission of the data frame if the node maintains control of the bus after insertion of the in-payload arbitration field; and
    halting transmission of the data frame before transmission of the data frame is complete if the node loses control of the bus after insertion of the in-payload arbitration field.

2. The method of claim 1, wherein control of the bus is gained, maintained, and/or lost via arbitration between nodes on the bus.

3. The method of claim 2, wherein arbitration involves bitwise arbitration based on an identifier in the start portion of the data frames.

4. The method of claim 1, wherein the in-payload arbitration field is inserted into the payload portion of the data frame based on the maximum amount of time that any one node should be able to tie up the bus by transmitting a single data frame.

5. The method of claim 1, further comprising, if the node loses control of the bus after insertion of the in-payload arbitration field, then resuming transmission of the data frame when the node regains control of the bus.

6. The method of claim 1, wherein a second node on the bus is configured to begin arbitrating for control of the bus in response to receiving the in-payload arbitration field from the node.

7. The method of claim 1, wherein the bus is a two wire bus.

8. The method of claim 7, wherein one of the two wires is driven high and the other wire is driven low to transmit a dominant signal and wherein neither of the two wires is driven high to transmit a recessive signal.

9. A device for communicating data frames on a bus that operates according to a multi-master bus protocol, the device comprising:
transmission control logic configured to control transmission of a data frame onto the bus, wherein control of data frame transmission comprises:
beginning transmission of a data frame from a node on the bus when the node gains control of the bus, wherein the multi-master bus protocol specifies a frame format that includes a start portion, a payload portion, and an end portion;
during transmission of the payload portion of the data frame, inserting an in-payload arbitration field into the transmission;
continuing transmission of the data frame if the node maintains control of the bus after insertion of the in-payload arbitration field; and
halting transmission of the data frame before transmission of the data frame is complete if the node loses control of the bus after insertion of the in-payload arbitration field.

10. The device of claim 9, wherein control of the bus is gained, maintained, and/or lost via arbitration between nodes on the bus.

11. The device of claim 9, wherein arbitration involves bitwise arbitration based on an identifier in the start portion of the data frames.

12. The device of claim 9, wherein the in-payload arbitration field is inserted into the payload portion of the data frame based on the maximum amount of time that any one node should be able to tie up the bus by transmitting a single data frame.

13. The device of claim 9, wherein the transmission control logic is further configured to, if the node loses control of the bus after insertion of the in-payload arbitration field, then resume transmission of the data frame when the node regains control of the bus.

14. An integrated circuit device comprising the device as recited in claim 9.

15. An apparatus comprising:
a plurality of nodes;
a bus connecting the plurality of nodes;
wherein the plurality of nodes communicate with each other according to a multi-master bus protocol;
wherein a first node of the plurality of nodes is configured to:
begin transmission of a data frame from the first node when the first node gains control of the bus, wherein the multi-master bus protocol specifies a frame format that includes a start portion, a payload portion, and an end portion;
during transmission of the payload portion of the data frame, insert an in-payload arbitration field into the transmission;
continue transmission of the data frame if the first node maintains control of the bus after insertion of the in-payload arbitration field; and
halt transmission of the data frame before transmission of the data frame is complete if the first node loses control of the bus after insertion of the in-payload arbitration field; and
wherein a second node of the plurality of nodes is configured to begin arbitrating for control of the bus in response to receiving the in-payload arbitration field from the first node.

16. The apparatus of claim 15, wherein the bus is a two wire bus.

17. The apparatus of claim 16, wherein one of the two wires is driven high and the other wire is driven low to transmit a dominant signal and wherein neither of the two wires is driven high to transmit a recessive signal.

18. The apparatus of claim 15, wherein control of the bus is gained, maintained, and/or lost via arbitration between the plurality of nodes on the bus.

19. The apparatus of claim 18, wherein arbitration involves bitwise arbitration based on an identifier in the start portion of the data frames.

20. The apparatus of claim 18, wherein the second node on the bus is configured to begin transmitting a data frame upon winning the arbitration and wherein the first node is configured to resume transmitting the data frame from the first node when control of the bus is regained.

* * * * *